US011946289B2

(12) United States Patent
Kim

(10) Patent No.: US 11,946,289 B2
(45) Date of Patent: Apr. 2, 2024

(54) TUBULAR-TYPE DEADBOLT DOOR LOCK WITH BACKSET ADJUSTMENT

(71) Applicant: RAONARK, Seoul (KR)

(72) Inventor: Jung Suk Kim, Seoul (KR)

(73) Assignee: RAONARK, Seoul (KR)

( * ) Notice: Subject to any disclaimer, the term of this patent is extended or adjusted under 35 U.S.C. 154(b) by 0 days.

(21) Appl. No.: 17/894,471

(22) Filed: Aug. 24, 2022

(65) Prior Publication Data

US 2024/0068276 A1 Feb. 29, 2024

(51) Int. Cl.
*E05B 63/06* (2006.01)
*E05B 55/00* (2006.01)

(52) U.S. Cl.
CPC ............ *E05B 63/06* (2013.01); *E05B 55/005* (2013.01)

(58) Field of Classification Search
CPC ........ E05B 63/06; E05B 55/005; E05C 1/163; E05C 9/021; Y10T 292/06; Y10T 292/0993; Y10T 292/1018; Y10T 292/307; Y10T 292/16; Y10T 292/163; Y10T 292/142; Y10T 292/379; Y10T 292/28; Y10S 292/60
See application file for complete search history.

(56) References Cited

U.S. PATENT DOCUMENTS

| | | | | |
|---|---|---|---|---|
| 5,647,617 A * | 7/1997 | Kajuch | E05B 55/12 292/336.5 |
| 2004/0212199 A1* | 10/2004 | Huang | E05B 63/06 292/337 |
| 2006/0137414 A1* | 6/2006 | Denison | E05B 47/0012 70/257 |
| 2007/0290514 A1* | 12/2007 | Halac | E05B 63/06 292/337 |
| 2016/0215525 A1* | 7/2016 | Ramakrishna | E05B 63/06 |

* cited by examiner

*Primary Examiner* — Christine M Mills
*Assistant Examiner* — Yahya Sidky
(74) *Attorney, Agent, or Firm* — STIP Law Group, LLC

(57) ABSTRACT

A tubular-type deadbolt door lock with backset adjustment is disclosed.
To this end, the present disclosure is characterized by including: a deadbolt guide case having a predetermined length and including a deadbolt guide and a deadbolt lever therein that is coupled to be able to rotate with respect to the deadbolt guide; a deadbolt case installed at a front portion in the deadbolt guide case and having a predetermined space therein; a tubular deadbolt case coupled to surround an outer circumferential surface of a front portion of the deadbolt case; a worm gear positioned in the deadbolt case; a helical gear engaged under the worm gear and rotating with rotation of the worm gear; and a rack gear engaged with the helical gear, being able to move forward and backward with rotation of the helical gear, and connected the deadbolt guide, in which when the rack gear is moved in a front-rear direction, the deadbolt guide is also moved in the front-rear direction, so the deadbolt guide case is moved in the front-rear direction and a backset length is adjusted.

4 Claims, 13 Drawing Sheets

【FIG.1】
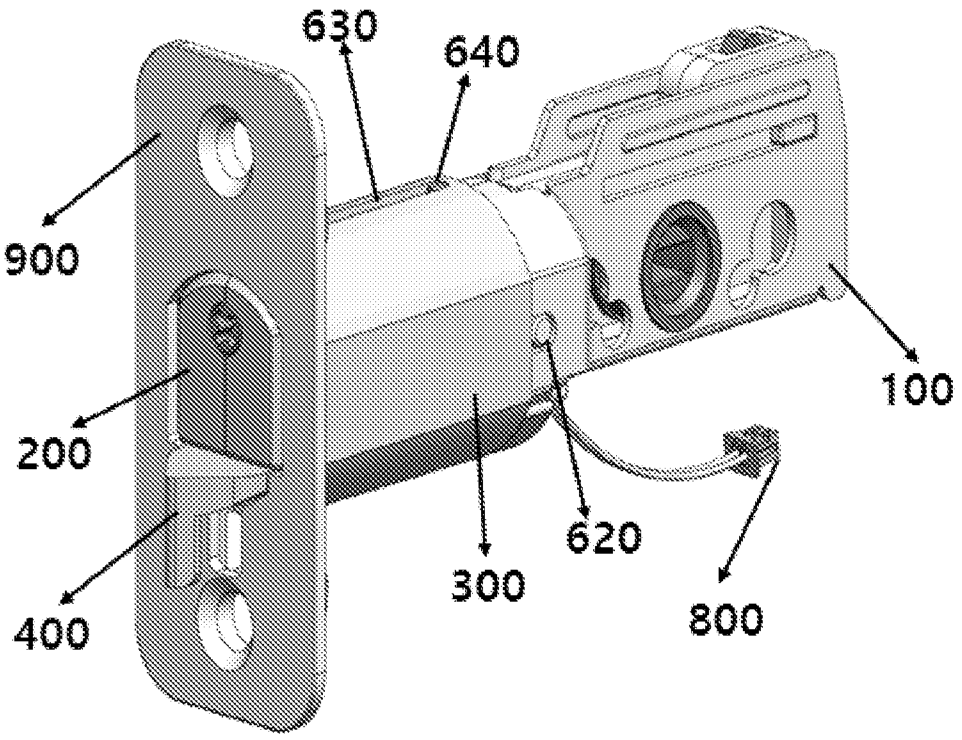

【FIG. 2】
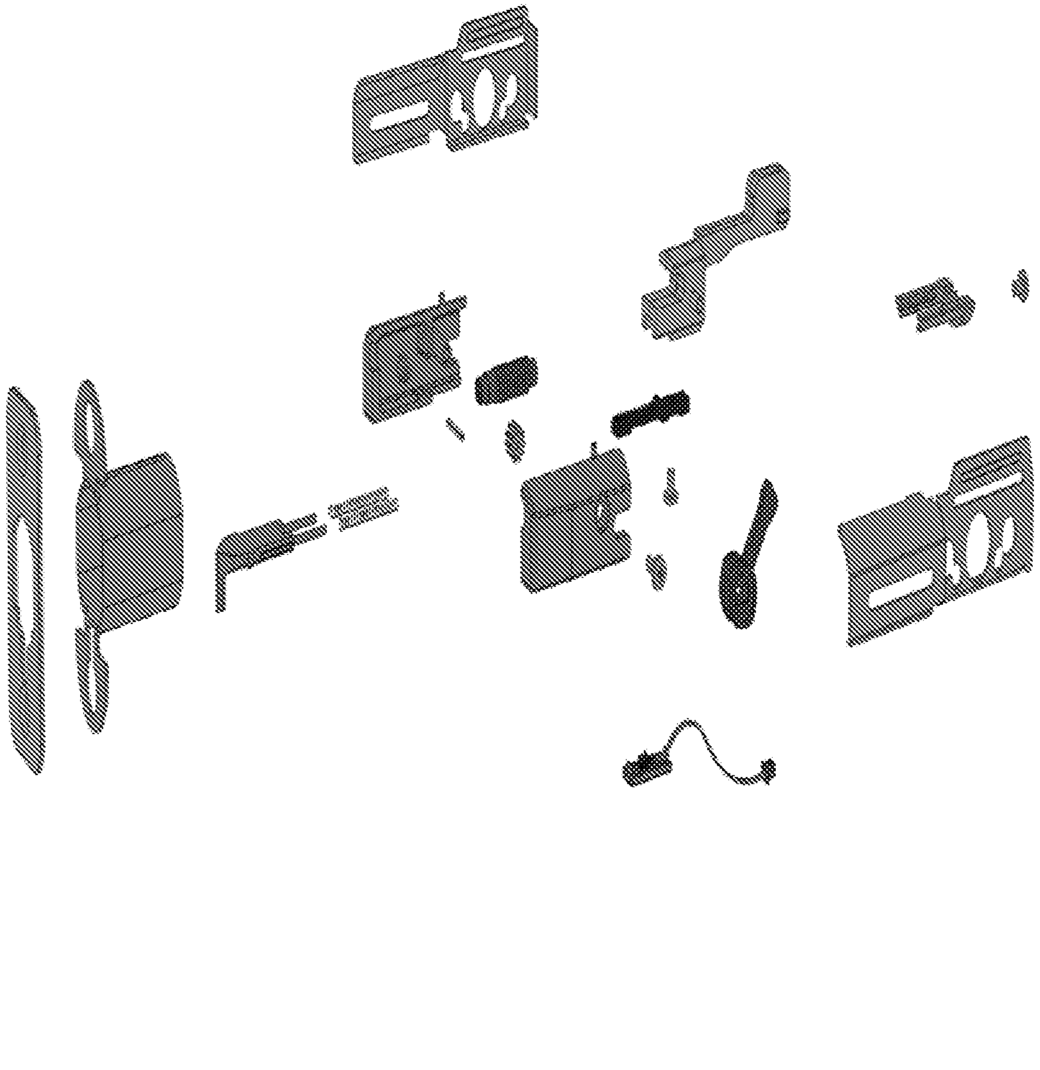

【FIG. 3】
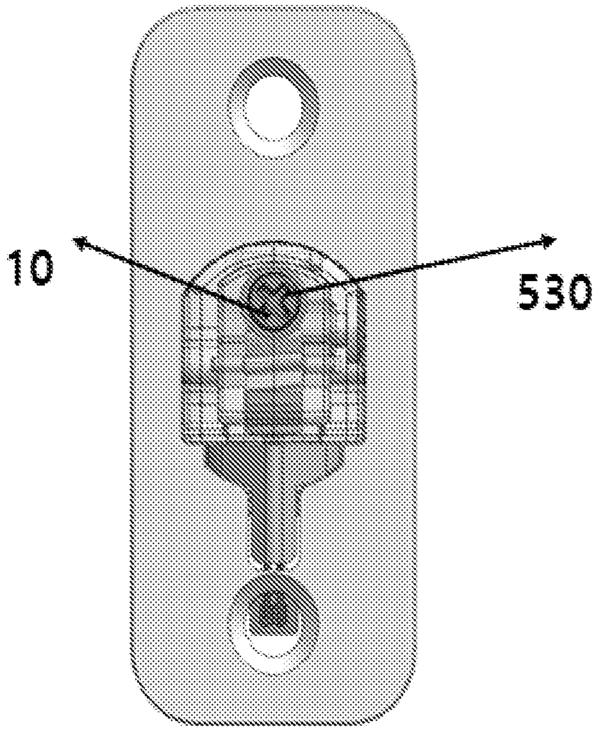

【FIG. 4】
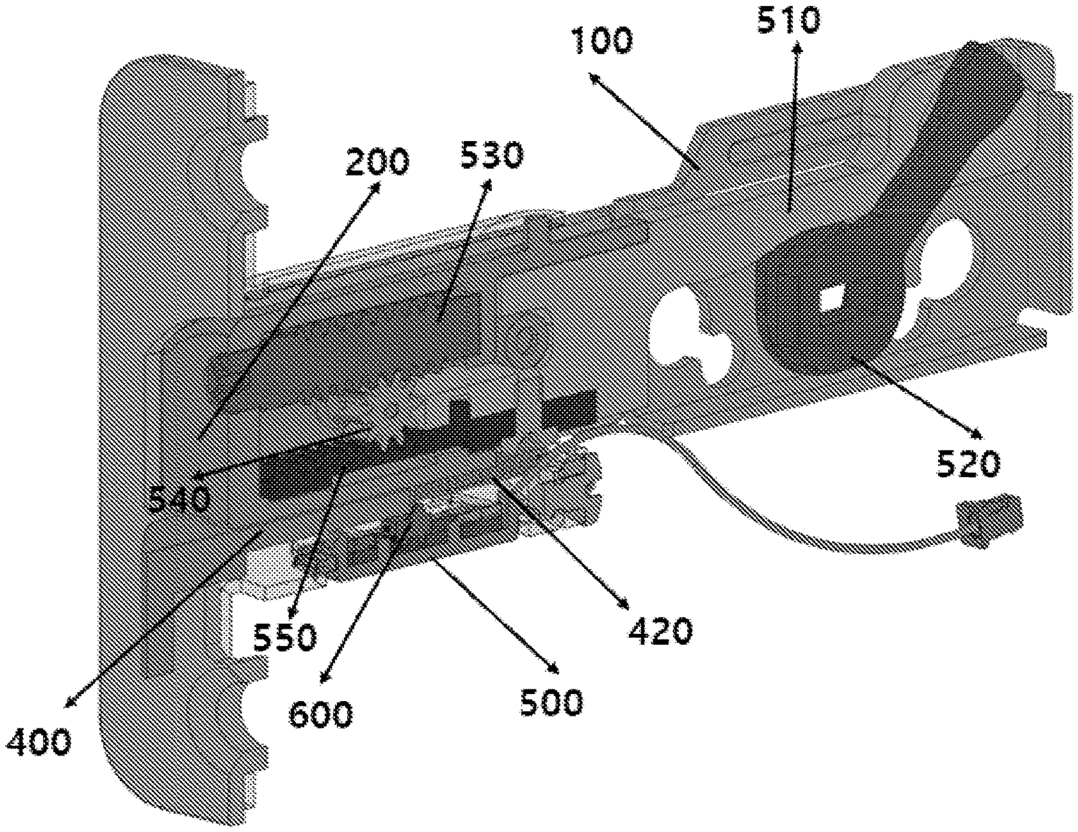

【FIG. 5】
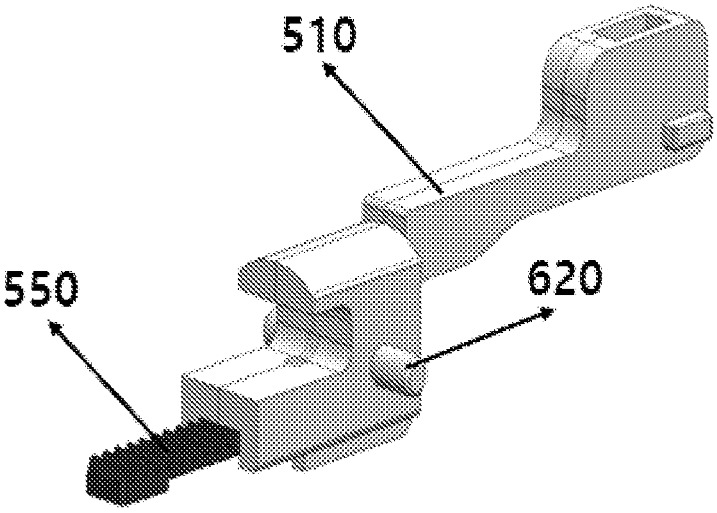

【FIG. 6】
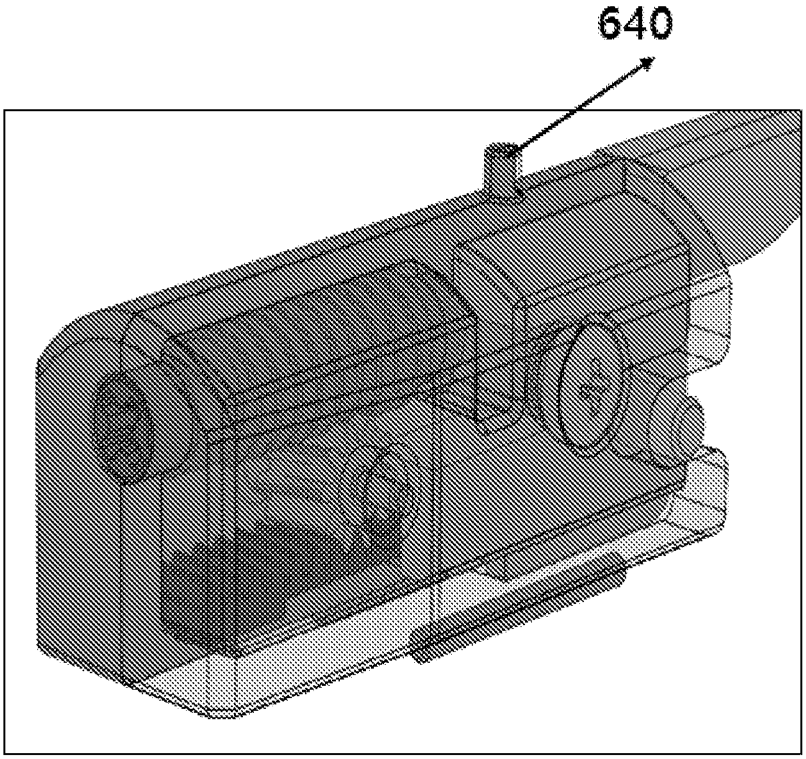

【FIG. 7】
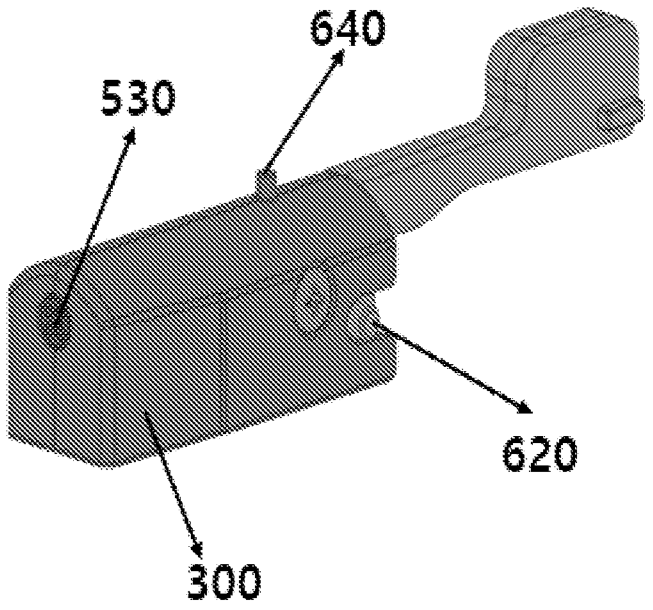

【FIG. 8】
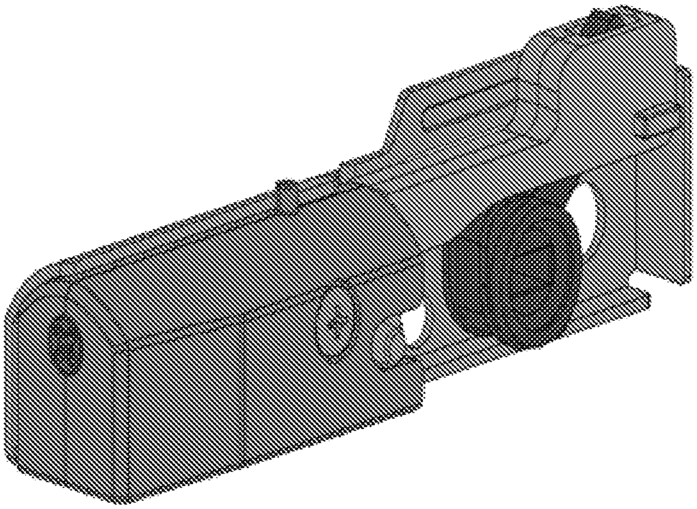

【FIG. 9】
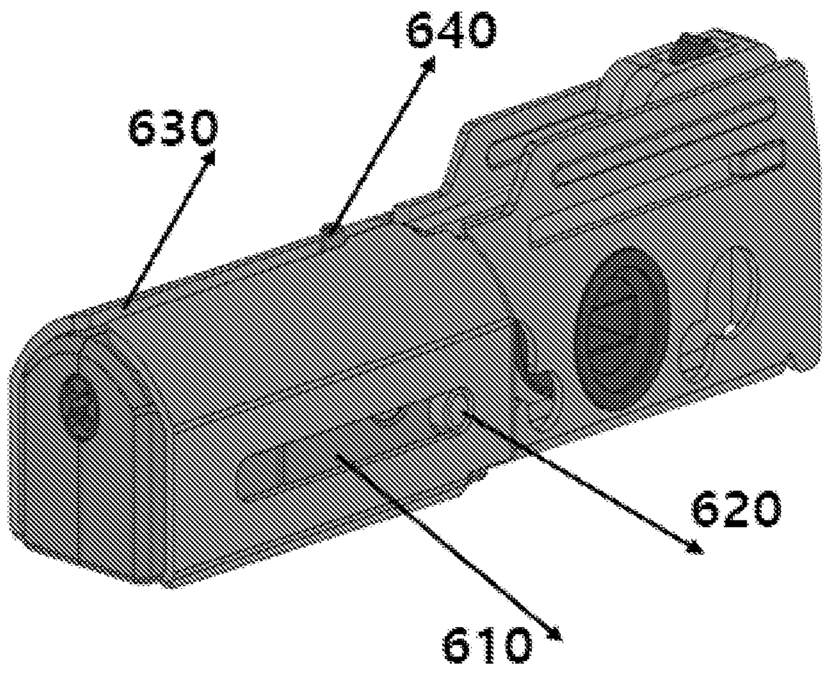

【FIG. 10】
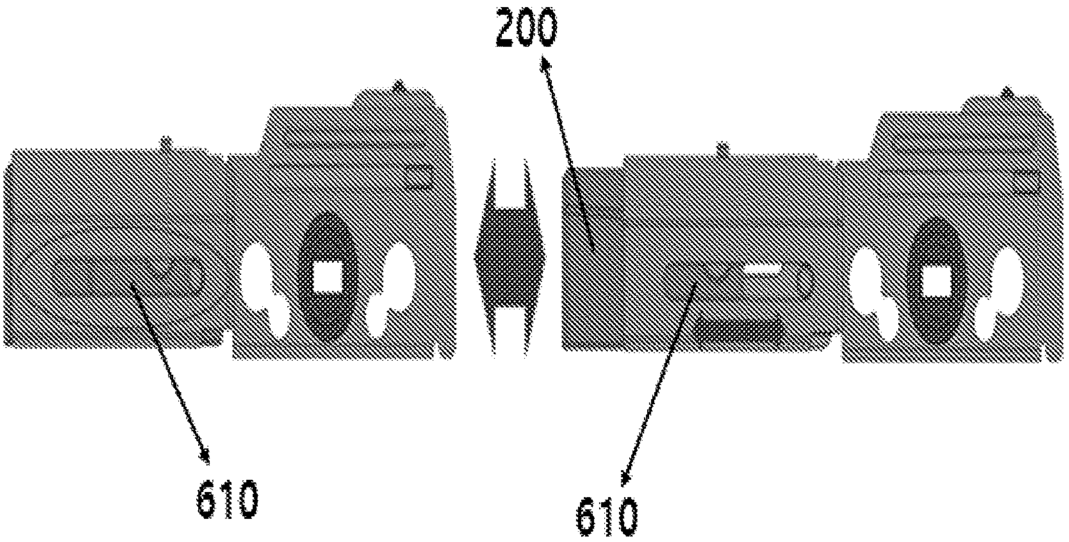

【FIG. 11】
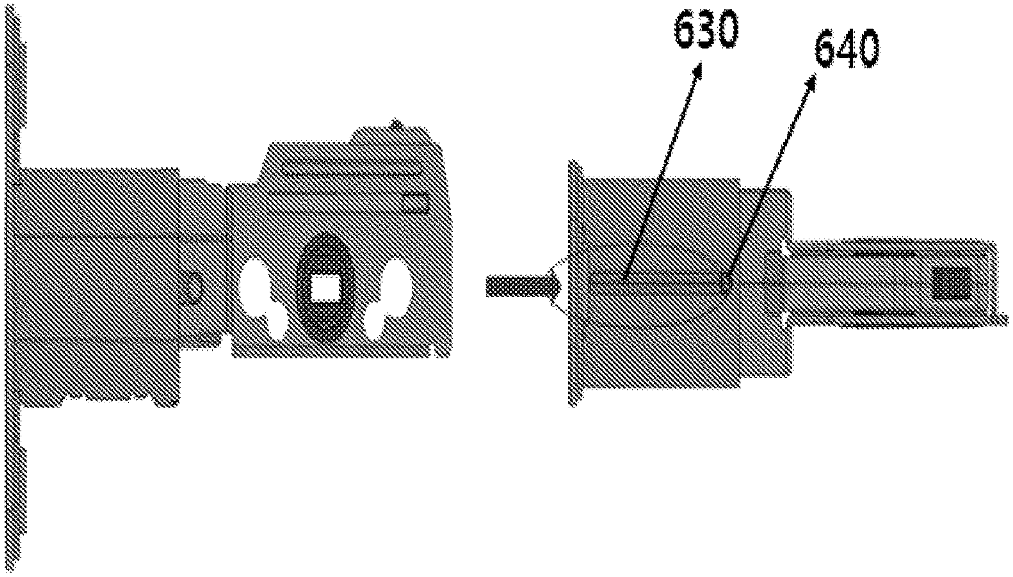

【FIG. 12】
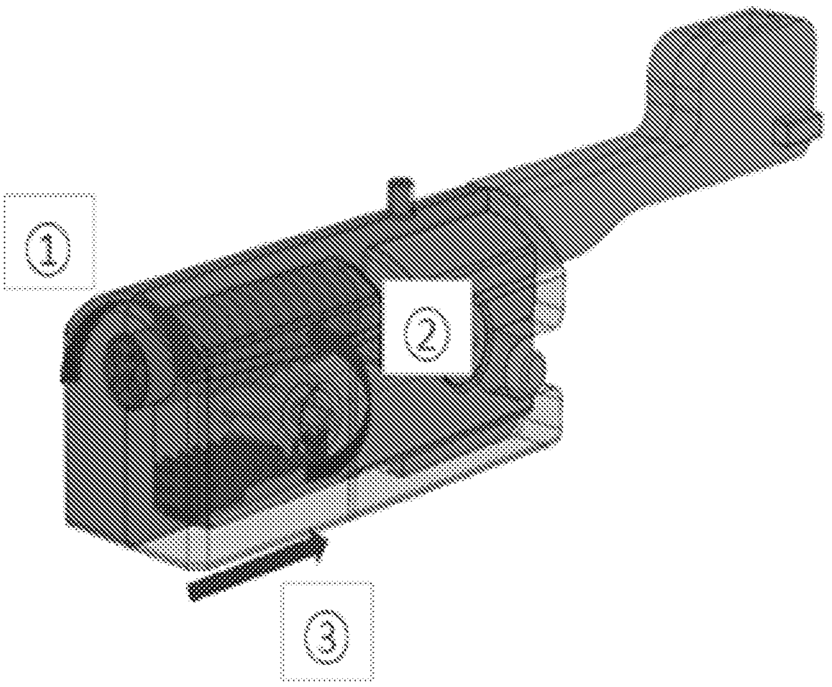

【FIG. 13】
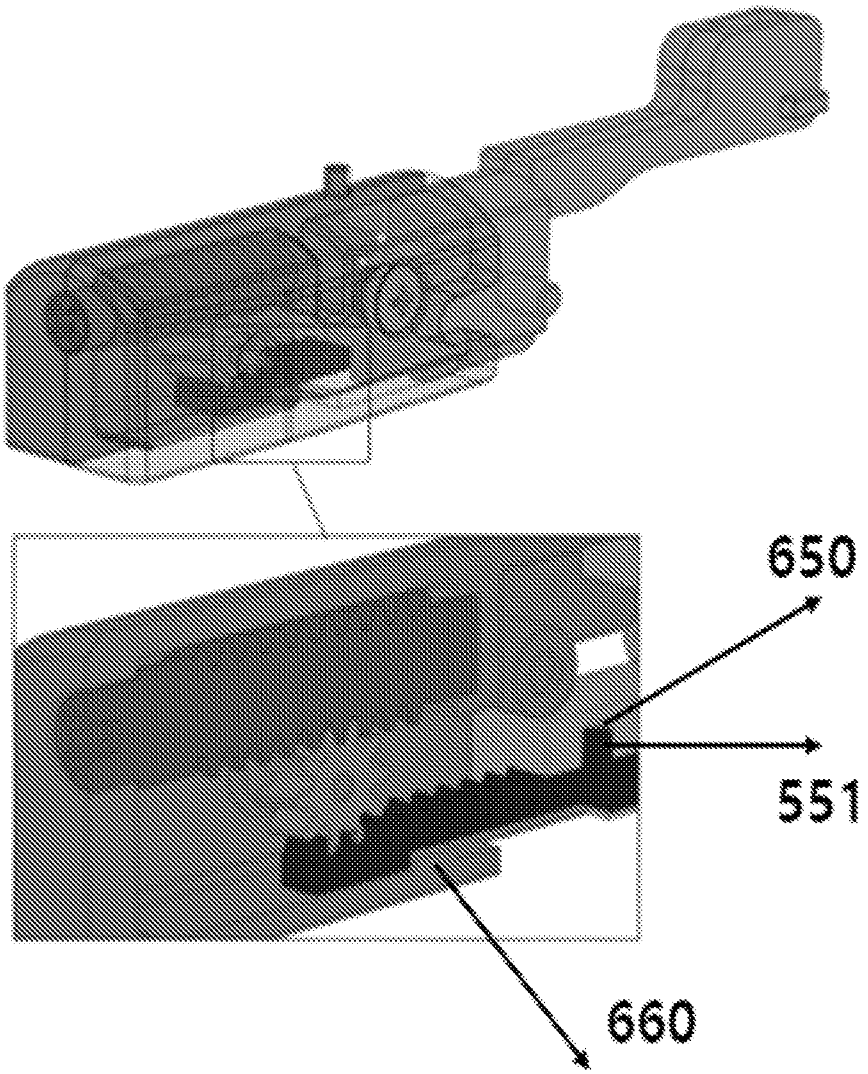

TUBULAR-TYPE DEADBOLT DOOR LOCK WITH BACKSET ADJUSTMENT

BACKGROUND

(a) Technical Field

The present disclosure relates to a tubular-type deadbolt door lock with backset adjustment.

(b) Background Art

In general, when a door lock is installed on an entrance door, an installation hole is formed in the entrance door, and in this case, as the entrance door, two kinds of entrance doors standardized to have a distance from the edge to the center of the installation hole, that is, a backset of about 60 mm or about 70 mm, are widely used.

That is, common entrance doors are bored such that the distance from an edge of the entrance door to the center of the bored hole in which a door lock is installed is 60 mm or 70 mm.

In this case, a tubular-type deadbolt door lock is changed for installation to be fitted to 60 mm or 70 mm and then installed or a product only for 60 mm or 70 mm is installed.

A hole is formed at a position between 60 mm and 70 mm in accordance with a machining deflection, there is a trouble that specific boring is required.

Accordingly, an adjustable backset is required to be able to install and use a door lock regardless of two kinds of entrance doors manufactured with different sizes of backsets.

SUMMARY OF THE DISCLOSURE

An objective of the present disclosure is to provide a structure that not only can cope with a backset of 60 mm or 70 mm, but also can be installed in a groove bored between 60 mm and 70 mm according to a boring tolerance without specific boring.

A tubular-type deadbolt door lock with backset adjustment is disclosed.

To this end, the present disclosure is characterized by including: a deadbolt guide case having a predetermined length and including a deadbolt guide and a deadbolt lever therein that is coupled to be able to rotate with respect to the deadbolt guide; a deadbolt case installed at a front portion in the deadbolt guide case and having a predetermined space therein; a tubular deadbolt case coupled to surround an outer circumferential surface of a front portion of the deadbolt case; a worm gear positioned in the deadbolt case; a helical gear engaged under the worm gear and rotating with rotation of the worm gear; and a rack gear engaged with the helical gear, being able to move forward and backward with rotation of the helical gear, and connected the deadbolt guide, in which when the rack gear is moved in a front-rear direction, the deadbolt guide is also moved in the front-rear direction, so the deadbolt guide case is moved in the front-rear direction and a backset length is adjusted.

A movement restriction groove having a predetermined length is formed on both sides of the deadbolt guide case and a stop protrusion having a predetermined length and formed at a position outside the deadbolt guide slides along the movement restriction groove, and the deadbolt guide case is moved along the movement restriction groove, whereby the backset length is adjusted.

A slit groove having a predetermined length is formed at the upper portion of the outer circumferential surface of the tubular deadbolt case and movement of the deadbolt case is restricted by the slit groove while a limit protrusion formed at the upper portion of the outer circumferential surface of the deadbolt case slides along the slit groove.

A rack gear protrusion protruding with a predetermined height is formed at a position of the rack gear, and a deadbolt guide groove having a predetermined depth is formed at a position of the deadbolt guide that corresponds to the rack gear protrusion, so the rack gear and the deadbolt guide are fitted to each other by the rack gear protrusion and the deadbolt guide groove.

A movement restriction projection protruding with a predetermined height is formed on a bottom inside the deadbolt case, and movement of the rack gear is restricted by the movement restriction projection.

According to the present disclosure having the configuration described above, there is provided a door lock that has backset adjustment to fit to a backset of 60 mm or bored in a common entrance door, which uses a tubular-type deadbolt door lock, and that makes it possible to freely change a backset initially from 60 mm to 70 mm by rotating a cross groove of the worm gear formed at a deadbolt.

Further, according to the present disclosure, there is provided a structure that not only can cope with a backset of 60 mm or 70 mm, but can be installed in a groove bored between 60 mm and 70 mm according to a boring tolerance without specific boring.

BRIEF DESCRIPTION OF THE DRAWINGS

FIG. 1 is an entire configuration view of the present disclosure and FIG. 2 is an exploded perspective view of the present disclosure.

FIG. 3 is a side view of the present disclosure and FIG. 4 is an internal perspective view of the present disclosure.

FIG. 5 is an engaged state view of a rack gear and a deadbolt guide and FIG. 6 is an internal perspective view in which a worm gear, a helical gear, and a rack gear are engaged.

FIGS. 7 and 8 are engaged state view of a deadbolt case and a deadbolt guide.

FIGS. 9, 10 and 11 are views for describing an operation state of the present disclosure.

FIGS. 12 to 13 are views for describing an operation state of the present disclosure.

DETAILED DESCRIPTION

Hereafter, a preferred embodiment of a tubular-type deadbolt door lock with backset adjustment that is the present disclosure is described with reference to the accompanying drawings.

FIG. 1 is an entire configuration view of the present disclosure and FIG. 2 is an exploded perspective view of the present disclosure.

FIG. 3 is a side view of the present disclosure and FIG. 4 is an internal perspective view of the present disclosure.

FIG. 5 is an engaged state view of a rack gear and a deadbolt guide and FIG. 6 is an internal perspective view in which a worm gear, a helical gear, and a rack gear are engaged.

FIGS. 7 and 8 are engaged state view of a deadbolt case and a deadbolt guide.

FIGS. 9 to 11 are views for describing an operation state of the present disclosure.

FIGS. 12 to 13 are views for describing an operation state of the present disclosure.

As shown in FIGS. 1 to 4, the present disclosure discloses a deadbolt guide case 100 having a predetermined length and including a deadbolt guide 510 and a deadbolt lever 520 therein that is coupled to be able to rotate with respect to the deadbolt guide 510.

The deadbolt guide case 100 is a kind of main body and has a predetermined space in which a deadbolt case 200 to be described below can be positioned.

The deadbolt case 200 installed at the front portion in the deadbolt guide case 100 and having a predetermined space therein is disclosed and a tubular deadbolt case 300 coupled to surround the outer circumferential surface of the front portion of the deadbolt case 200 is disclosed.

Meanwhile, the deadbolt guide 510 and the deadbolt lever 50 coupled to be able to rotate with respect to the deadbolt guide 510 are installed in the deadbolt guide case 100.

As shown in the figures, the tubular deadbolt case 300 is formed in a cylindrical shape.

Meanwhile, as shown in FIG. 4, a worm gear 530 having a predetermined length is formed in the deadbolt case 200, and as shown in FIG. 3, the worm gear 530 is rotated when a cross-shaped groove 10 formed at the worm gear 530 is rotated using a specific tool.

A helical gear 540 engaged with the worm gear 530 and rotating with rotation of the worm gear 530 and a rack gear 550 engaged with the helical gear 540 and being able to move in the front-rear direction with rotation of the helical gear 540 are positioned under the worm gear 530.

That is, FIG. 5 is an engaged state view of the rack gear 550 and the deadbolt guide 510 and FIG. 6 is an internal perspective view in which the worm gear 530, the helical gear 540, and the rack gear 550 are engaged, which are described hereafter.

When the rack gear 550 is moved forward or backward by rotation of the helical gear 540, the deadbolt guide 510 connected to the helical gear 540 is also moved forward or backward, and accordingly, the deadbolt guide case 100 in which the deadbolt guide 510 and the deadbolt lever 520 are positioned therein is also moved forward or backward.

That is, as the deadbolt guide case 100 is moved forward and backward, whereby a backset length is adjusted.

Meanwhile, the present disclosure is described in detail with reference to FIGS. 7 to 10.

A movement restriction groove 610 having a predetermined length is formed on both sides of the deadbolt guide case 100 and a stop protrusion 620 having a predetermined length and formed at a position outside the deadbolt guide 510 slides along the movement restriction groove 610. Further, the deadbolt guide case 100 is moved along the movement restriction groove 610, whereby the backset length is adjusted.

That is, a hole is bored in entrance doors such that the distance from an edge of the entrance doors to the center of the bored hole in which a door lock is installed is 60 mm or 70 mm in the related art, but according to the present disclosure, the distance is not limited to 60 mm or 70 mm and a door lock can be freely installed and adjusted with a backset of a length that a user wants.

Meanwhile, another operation relationship of the present disclosure is described hereafter with reference to FIGS. 11 to 12.

As shown in the figures, a slit groove 630 having a predetermined length is formed at the upper portion of the outer circumferential surface of the tubular deadbolt case 300 and movement of the deadbolt case 200 is restricted by the slit groove 630 while a limit protrusion 640 formed at the upper portion of the outer circumferential surface of the deadbolt case 200 slides along the slit groove 640.

That is, when the deadbolt is forcibly pressed from the outside, the deadbolt is not moved backward in the pressing direction.

Meanwhile, as shown in FIG. 13, a rack gear protrusion 551 protruding with a predetermined height is formed at a position of the rack gear 550 and a deadbolt guide groove 650 having a predetermined depth is formed at a position of the deadbolt guide 510 that corresponds to the rack gear protrusion 551, so the rack gear 550 and the deadbolt guide 510 are fitted to each other by the rack gear protrusion 551 and the deadbolt guide groove 650.

Accordingly, as the rack gear 550 is moved, the deadbolt guide 510 is also moved, whereby it is possible to adjust a backset length into a length that a user wants.

Further, a movement restriction projection 660 protruding with a predetermined height is formed on the bottom inside the deadbolt case 200, so movement of the rack gear 550 is restricted by the movement restriction projection 660.

In detail, the rack gear 550 is initially moved from 0 mm to 10 mm and then no longer moved.

According to the present disclosure, in order to an initially set backset of 60 mm to 70 mm, when the cross groove 10 of the worm gear 530 is rotated clockwise, the helical gear 540 connected with the worm gear 530 is rotated counter-clockwise and the rack gear 550 connected thereto is moved forward 550 and can be moved to the section of 70 mm.

In this case, there is an advantage that a user can position a backset at a desired position within the section from 60 mm to 70 mm.

Components not described are described hereafter.

The deadbolt guide case 100 is a kind of main body and an edge bolt 400 is positioned therein.

A face plate 900 is positioned at the front, and as shown in FIG. 4, a base 500 fitted on the lower portion of the tubular deadbolt case 300 and a sensor 600 positioned over the base 500 and sensing movement of the edge bolt 400 are disclosed.

What is claimed is:

1. A tubular-type deadbolt door lock with backset adjustment, the tubular-type deadbolt door lock comprising:

- a deadbolt guide case having a predetermined length and including a deadbolt guide and a deadbolt lever therein that is coupled to be able to rotate with respect to the deadbolt guide;
- a deadbolt case installed at a front portion in the deadbolt guide case and having a predetermined space therein;
- a tubular deadbolt case coupled to surround an outer circumferential surface of a front portion of the deadbolt case;
- a worm gear positioned in the deadbolt case;
- a helical gear engaged under the worm gear and rotating with rotation of the worm gear; and
- a rack gear engaged with the helical gear, being able to move forward and backward with rotation of the helical gear, and connected the deadbolt guide, wherein,

- when the rack gear is moved in a front-rear direction, the deadbolt guide is also moved in the front-rear direction, so the deadbolt guide case is moved in the front-rear direction and a backset length is adjusted,
- a movement restriction groove having a predetermined length is formed on both sides of the deadbolt guide case and a stop protrusion having a predetermined length and formed at a position outside the deadbolt guide slides along the movement restriction groove, and the deadbolt guide case is moved along the movement restriction groove, whereby the backset length is adjusted.

2. The tubular-type deadbolt door lock of claim 1, wherein a slit groove having a predetermined length is formed at the upper portion of the outer circumferential surface of the tubular deadbolt case and movement of the deadbolt case is restricted by the slit groove while a limit protrusion formed at the upper portion of the outer circumferential surface of the deadbolt case slides along the slit groove.

3. The tubular-type deadbolt door lock of claim 2, wherein a rack gear protrusion protruding with a predetermined height is formed at a position of the rack gear, and a deadbolt guide groove having a predetermined depth is formed at a position of the deadbolt guide that corresponds to the rack gear protrusion, so the rack gear and the deadbolt guide are fitted to each other by the rack gear protrusion and the deadbolt guide groove.

4. The tubular-type deadbolt door lock of claim 3, wherein a movement restriction projection protruding with a predetermined height is formed on a bottom inside the deadbolt case, and movement of the rack gear is restricted by the movement restriction projection.

* * * * *